(12) United States Patent
Ishikura

(10) Patent No.: US 10,965,829 B2
(45) Date of Patent: *Mar. 30, 2021

(54) IMAGE FORMING APPARATUS HAVING RESTRICTED USB SOCKET

(71) Applicant: Sharp Kabushiki Kaisha, Sakai (JP)

(72) Inventor: Hiroyuki Ishikura, Sakai (JP)

(73) Assignee: SHARP KABUSHIKI KAISHA, Sakai (JP)

(*) Notice: Subject to any disclaimer, the term of this patent is extended or adjusted under 35 U.S.C. 154(b) by 141 days.

This patent is subject to a terminal disclaimer.

(21) Appl. No.: 16/392,763

(22) Filed: Apr. 24, 2019

(65) Prior Publication Data

US 2019/0253577 A1 Aug. 15, 2019

Related U.S. Application Data

(63) Continuation of application No. 15/642,383, filed on Jul. 6, 2017, now Pat. No. 10,321,004, which is a (Continued)

(30) Foreign Application Priority Data

Nov. 24, 2011 (JP) .............................. JP2011-256000

(51) Int. Cl.
*H04N 1/00* (2006.01)
*G06F 3/12* (2006.01)
*G03G 15/00* (2006.01)

(52) U.S. Cl.
CPC ..... *H04N 1/00912* (2013.01); *G03G 15/5066* (2013.01); *G03G 15/5075* (2013.01);
(Continued)

(58) Field of Classification Search
CPC .............. G06F 3/128; G03G 15/5075; G03G 15/5066; G03G 15/55; H04N 1/00315;
(Continued)

(56) References Cited

U.S. PATENT DOCUMENTS 8,011,013 B2* 8/2011 Bacastow ............... G06F 21/85
726/27
9,529,559 B2* 12/2016 Ishikura ............. H04N 1/00965
(Continued)

OTHER PUBLICATIONS

Ishikura, "Image Forming Apparatus Having Restricted USB Socket", U.S. Appl. No. 15/642,383, filed Jul. 6, 2017.

*Primary Examiner* — Ming Y Hon
(74) *Attorney, Agent, or Firm* — Keating & Bennett, LLP

(57) ABSTRACT

An image forming apparatus is provided with USB sockets on front and back sides, and includes a determining unit for determining whether or not a USB device inserted to a front side USB socket is a function enhancement device, and a control unit making, when it is determined by the determining unit that a function enhancement device is inserted to the front side USB socket, the USB device unusable and making, when it is determined that a USB device other than the function enhancement device is inserted, the USB device usable. Thus, it is possible to prevent a USB wireless LAN adapter or the like from being used constantly connected to the front side USB socket and thereby to reduce possibility of USB wireless LAN adapter of being damaged or removed.

17 Claims, 9 Drawing Sheets

Related U.S. Application Data continuation of application No. 15/351,519, filed on Nov. 15, 2016, now Pat. No. 9,749,491, which is a continuation of application No. 14/353,248, filed as application No. PCT/JP2012/072718 on Sep. 6, 2012, now Pat. No. 9,529,559.

(52) U.S. Cl.
CPC ............ *G03G 15/55* (2013.01); *G06F 3/128* (2013.01); *H04N 1/00204* (2013.01); *H04N 1/00222* (2013.01); *H04N 1/00315* (2013.01); *H04N 1/00965* (2013.01); *H04N 2201/0039* (2013.01); *H04N 2201/0041* (2013.01); *H04N 2201/0051* (2013.01); *H04N 2201/0055* (2013.01); *H04N 2201/0056* (2013.01); *H04N 2201/0063* (2013.01); *H04N 2201/0082* (2013.01); *H04N 2201/0094* (2013.01)

(58) Field of Classification Search
CPC ... H04N 2201/0094; H04N 2201/0036; H04N 2201/0082; H04N 2201/0063; H04N 2201/0055; H04N 2201/0041; H04N 2201/0051; H04N 2201/0039
See application file for complete search history.

(56) References Cited

U.S. PATENT DOCUMENTS

| | | | |
|---|---|---|---|
| 9,749,491 B2* | 8/2017 | Ishikura | G06F 3/128 |
| 2006/0037084 A1* | 2/2006 | Brown | G06F 21/85 |
| | | | 726/28 |
| 2006/0143716 A1* | 6/2006 | Ikemoto | G06F 21/57 |
| | | | 726/27 |
| 2006/0283937 A1* | 12/2006 | Daniel | H04N 1/32122 |
| | | | 235/382 |
| 2007/0024902 A1* | 2/2007 | Kato | G06F 3/128 |
| | | | 358/1.15 |
| 2007/0030517 A1* | 2/2007 | Narayanan | H04N 1/00278 |
| | | | 358/1.15 |
| 2007/0088967 A1* | 4/2007 | Fu | G06F 1/266 |
| | | | 713/340 |
| 2008/0147924 A1* | 6/2008 | Lambert | G06F 13/4072 |
| | | | 710/62 |
| 2009/0180144 A1* | 7/2009 | Ito | G03G 15/502 |
| | | | 358/1.16 |
| 2009/0307679 A1* | 12/2009 | Lee | G06F 8/38 |
| | | | 717/168 |
| 2010/0030925 A1* | 2/2010 | Inoue | G06F 3/1204 |
| | | | 710/16 |
| 2010/0153643 A1* | 6/2010 | Kobayashi | G06F 3/1204 |
| | | | 711/115 |
| 2012/0092724 A1* | 4/2012 | Pettis | G06F 3/1206 |
| | | | 358/1.15 |
| 2014/0026198 A1* | 1/2014 | Isozaki | H04L 63/10 |
| | | | 726/4 |
| 2014/0189172 A1* | 7/2014 | Sadeghi | G06F 13/385 |
| | | | 710/105 |

* cited by examiner

FIG.8

| CLASS ID | DESCRIPTION |
|---|---|
| 00h | UNDEFINED |
| 01h | AUDIO |
| 02h | COMMUNICATION AND CDC CONTROL |
| 03h | HUMAN INTERFACE |
| 05h | PID (PHYSICAL INTERFACE DEVICE) |
| 06h | IMAGE |
| 07h | PRINTER |
| 08h | MASS STORAGE |
| 09h | HUB |
| 0Ah | CDC DATA |
| 0Bh | SMART CARD |
| 0Dh | CONTENTS SECURITY |
| 0Eh | VIDEO |
| 0Fh | PERSONAL HEALTH CARE |
| DCh | TESTING DEVICE |
| E0h | WIRELESS CONTROLLER |
| EFh | OTHERS |
| FEh | DEFINED BY APPLICATION |
| FFh | DEFINED BY VENDOR |

IMAGE FORMING APPARATUS HAVING RESTRICTED USB SOCKET

TECHNICAL FIELD

The present invention relates to an image forming apparatus having a USB (Universal Serial Bus) port and, more specifically, to an image forming apparatus capable of preventing damage to or erroneous removal of a connected function enhancement device such as a USB wireless LAN adapter.

BACKGROUND ART

As one type of image processing apparatuses as electronic equipment, an image forming apparatus (typically a copy machine) for forming an image on a sheet of recording paper has been introduced to many places of business (companies and offices). In such a place of business, it is a common practice to have an image forming apparatus having a printer function or a copy function connected to a network and to share the apparatus by a plurality of users. An MFP (MultiFunction Peripheral) as one type of such image forming apparatuses has a plurality of basic operational modes including a copy mode, a facsimile mode (hereinafter facsimile will be also denoted as FAX), a network compatible printer mode and a scanner mode.

The image forming apparatus has, for example, a NIC (Network Interface Card) as an interface for connection to the network. The NIC has a terminal, to which a communication cable such as a UTP (Unshielded Twisted Pair) cable is connected, so that the image forming apparatus is connected to the network. When connected to the network, the image forming apparatus can realize the functions of receiving and printing image data from a terminal such as a PC connected to the network, transmitting an image data obtained by scanning a document by attaching it to an electronic mail, or transferring the image data to a computer server using FTP.

Recently, wireless network environment has come to be advanced, since it eliminates the necessity of hard-wiring and facilitates installment of equipment. As a device for wireless connection, a compact USB adapter for wireless LAN (hereinafter referred to as a USB wireless LAN adapter) in compliance with international standard such as IEEE802.11 series has been widely used. When a USB wireless LAN adapter is mounted on an apparatus such as a PC, the PC becomes connectable to a router, an access point or the like by radio wave in the frequency band of, for example, 2.4 GHz. Further, since Wi-Fi has made it possible to verify inter-connectability among manufacturers of wireless LAN devices, wireless network connections are growing more popular.

By way of example, Japanese Patent Laying-Open No. 2011-82677 (hereinafter referred to as '677 Reference) discloses a USB wireless LAN adapter that changes the methods of communication (isochronous transfer or bulk transfer) depending on the type of communication data (streaming data or not) and on the situation of communication (isochronous transfer is in progress or not).

A USB port of a PC or the like is used for connecting various peripheral devices, in addition to the wireless LAN adapter. As a USB-connectable peripheral device, a USB memory is widely used. A USB memory is of large capacity, small, light-weight, portable and easy-to-handle and, therefore, it is used for moving data of a large data size, such as image data, to another device.

Image forming apparatuses having a number of USB ports have been known. In such an image forming apparatus, a USB wireless LAN adapter is used in a constantly connected state, always connected to one USB port (always kept connected while the power of image forming apparatus is ON), to enable wireless connection to the network. It is possible for a user to insert USB memory to another USB port of the image forming apparatus to input image data to be printed stored in the USB memory to the image forming apparatus, or to store image data of a scanned document or the like in the USB memory to move to another device such as a PC.

DISCLOSURE OF THE INVENTION

Problems to be Solved by the Invention

When a USB wireless LAN adapter is connected to a USB port on a front side of an image forming apparatus, the USB wireless LAN adapter can easily be pulled out and, hence, there is a possibility that the user erroneously pulls out the USB wireless LAN adapter, resulting in disconnection of communication. Further, since the user stands in front of the image forming apparatus and operates the image forming apparatus, it is possible that the user's body touches or hits the USB wireless LAN adapter and damages the USB wireless LAN adapter. Further, when a user or some other person passes in front of the image forming apparatus, he/she may inadvertently touch and damage the USB wireless LAN adapter. As described above, the conventional image forming apparatus has a problem that a USB device such as a USB wireless LAN adapter is connected to a USB port from which the inserted USB device can easily be removed by a user, and used as it is.

In an apparatus having a plurality of USB ports as in the case of a general PC, a peripheral device can be used connected to any of the USB ports. The same applies to the conventional image forming apparatus having a plurality of USB ports. The above-described problem cannot be solved by the invention described in '677 Reference.

Therefore, an object of the present invention is to provide an image forming apparatus capable of reducing the possibility of a USB-connected function enhancement device such as a USB wireless LAN adapter being damaged by an external force and the possibility of such a device being erroneously removed.

Means for Solving the Problems

The above-described object can be attained by the following.

Specifically, the object can be attained by the image forming apparatus in accordance with the present invention provided with a plurality of USB sockets. The image forming apparatus includes a determining unit for determining whether or not a USB device connected to a specific USB socket of the plurality of USB sockets is a prescribed device; and a control unit for selectively executing a process of keeping unusable the USB device determined to be the prescribed device, or a process of making usable the USB device not determined to be the prescribed device, depending on a result of determination by the determining unit, and the specific USB socket is arranged at a position allowing insertion and removal of a USB device by a user operating the image forming apparatus.

Preferably, the prescribed device is a USB device for communication with external equipment.

More preferably, the image forming apparatus further includes an operation unit receiving an instruction to the image forming apparatus; the specific USB socket is arranged on a front side of the image forming apparatus where the operation unit is arranged; and each of the plurality of USB sockets other than the specific USB socket is arranged on a side other than the front side of the image forming apparatus.

More preferably, each of the plurality of USB sockets other than the specific USB socket is arranged on a back side opposite to the front side of the image forming apparatus.

Preferably, the determining unit determines whether or not the USB device connected to the specific USB socket is the prescribed device by obtaining class information of the USB device from the USB device connected to the specific USB socket and determining whether or not the obtained class information is prescribed class information.

More preferably, the determining unit determines whether or not the USB device connected to said specific USB socket is the prescribed device by obtaining a vendor ID and a product ID of the USB device from the USB device connected to the specific USB socket and determining whether the obtained vendor ID and the obtained product ID are a prescribed vendor ID and a prescribed product ID.

More preferably, the image forming apparatus further includes a display unit for displaying information, and the process of the control unit keeping unusable the USB device includes a process of displaying information that the USB device is unusable on the display unit.

Effects of the Invention

According to the present invention, if a USB device for communication with an external device is connected to that specific one of a plurality of USB sockets (USB ports) provided on the image forming apparatus to/from which the user can easily insert/remove a USB device, the USB device is not made usable and, therefore, possibility of erroneous removal during use or possibility of any damage can be reduced.

Since the USB socket positioned on the front side of image forming apparatus is the object of restriction, it is possible for the user to easily use a USB memory or the like on the front side of image forming apparatus and, in addition, it is possible to prevent erroneous connection of the specific USB device to the USB socket on the front side.

Since the USB device of which use is restricted is determined using descriptor information (class ID, vendor ID and product ID) of known USB standard, any USB device supplied from a manufacturer can be used as it is without any necessity of storing special information in the USB device.

BRIEF DESCRIPTION OF THE DRAWINGS

FIG. 8 shows examples of class ID of USB descriptor.

DESCRIPTION OF EMBODIMENTS

In the embodiment described in the following, the same components are denoted by the same reference numbers. Their names and functions are also the same. Therefore, detailed description thereof will not be repeated.

Figure 1:
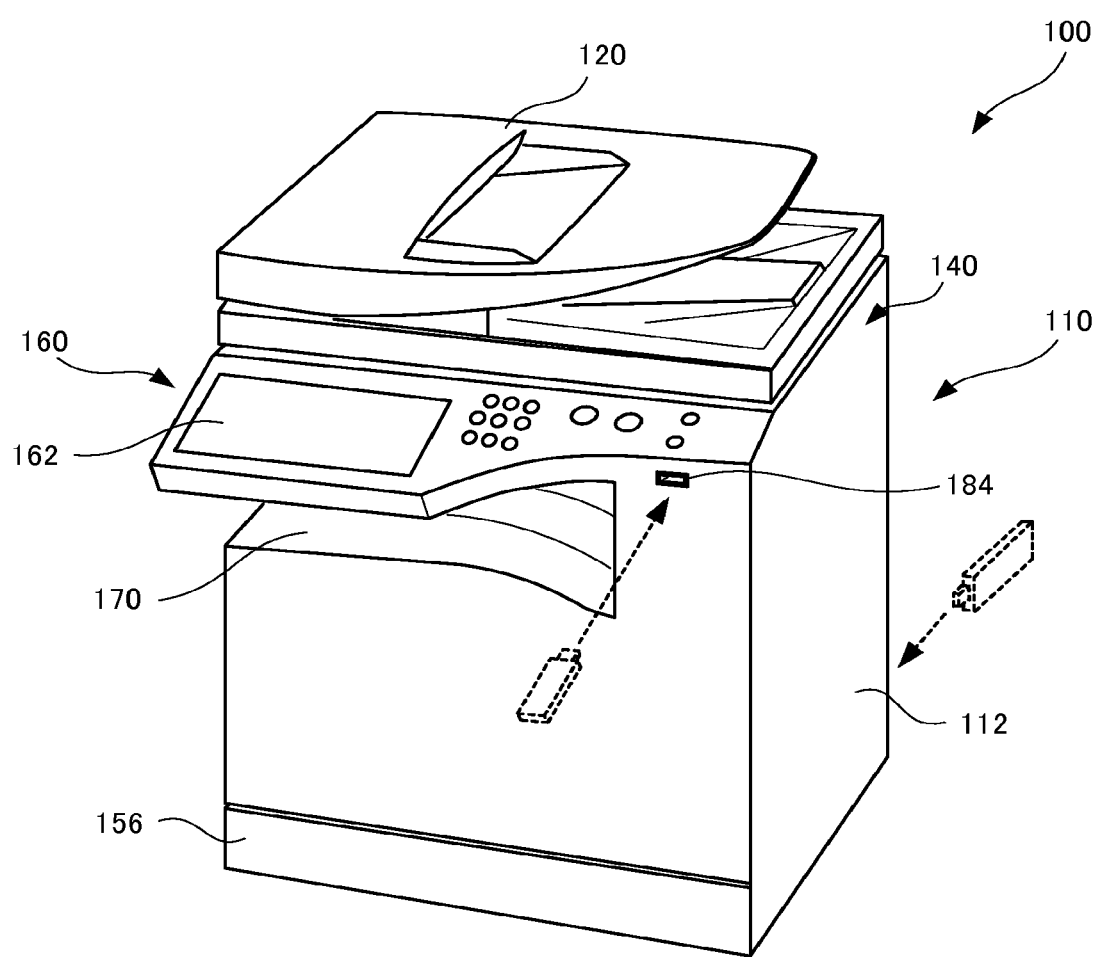
FIG. 1 is a perspective view showing the image forming apparatus in accordance with an embodiment of the present invention.
Figure 2:
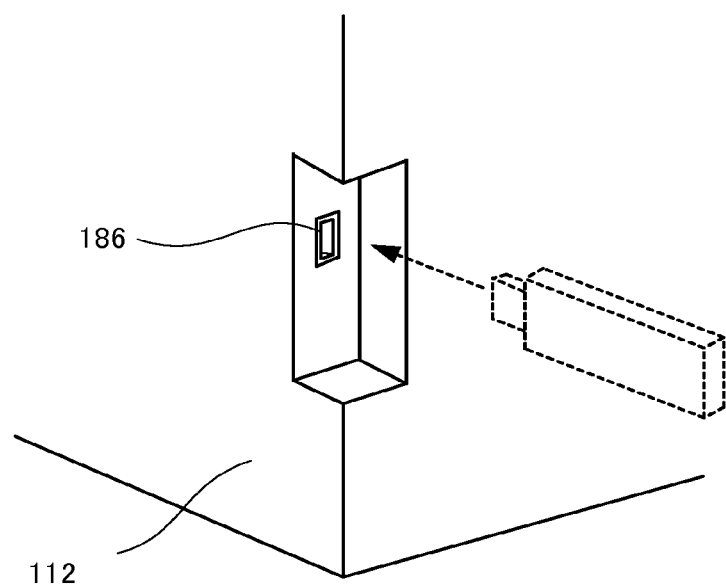
FIG. 2 is a perspective view showing a part of the back side of image forming apparatus in accordance with an embodiment of the present invention.

Referring to FIGS. 1 and 2, an image forming apparatus 100 in accordance with an embodiment of the present invention forms a multi-color or single-color image on prescribed recording paper in accordance with image data generated by reading a document. Image forming apparatus 100 includes a body 110 and an automatic document feeder 120.

On an upper portion (inside) of body 110, an image reading unit 140 is arranged. Image reading unit 140 scans a document fed by automatic document feeder 120 and generates image data. At an upper portion of body 110, an operation unit 160 is arranged. Image forming apparatus 100 executes a process in accordance with an instruction input through operation unit 160. At a lower portion of body 110, a paper feed unit 156 for holding sheets of recording paper for forming images is arranged. Image forming apparatus draws out a sheet of recording paper from paper feed unit 156, forms an image on the surface of the sheet, and discharges the sheet to an in-barrel type paper discharge tray 170.

Body 110 has a front side USB socket 184 and a back side USB socket 186. Front side USB socket 184 is arranged on the front side, which has operation unit 160 thereon and faces the user operating image forming apparatus 100. Back side USB socket 186 is arranged on the back side opposite to the front side. Specifically, back side USB socket 186 is arranged on the back side surface near a right side surface 112 of body 110, as shown in FIG. 2. In FIGS. 1 and 2, USB devices to be inserted to front side USB socket 184 and back side USB socket 186 are shown by dotted lines.

Figure 3:
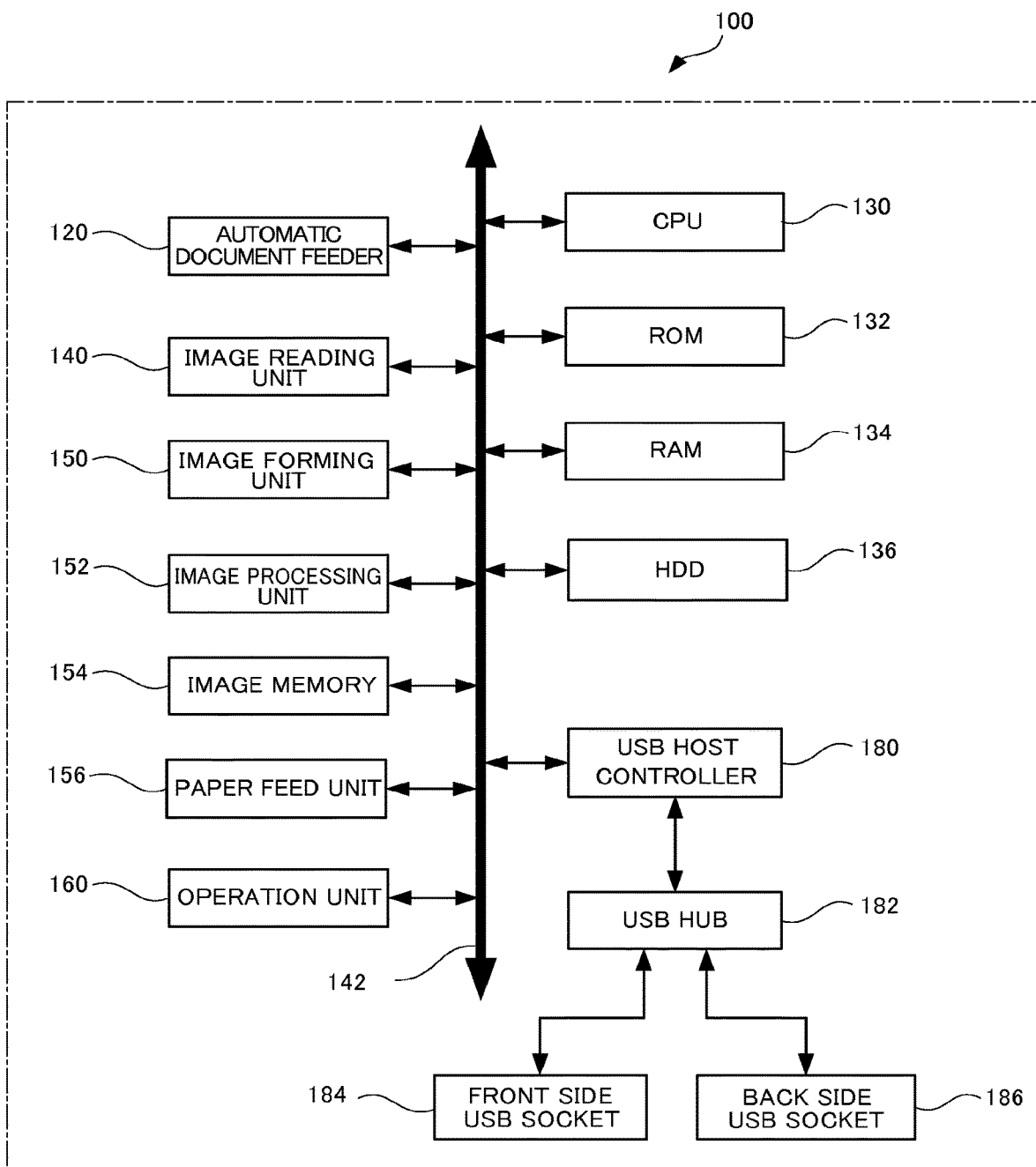
FIG. 3 is a block diagram showing a schematic configuration of the image forming apparatus in accordance with an embodiment of the present invention.

Referring to FIG. 3, image forming apparatus 100 includes a control unit (hereinafter referred to as CPU) 130 for overall control of image forming apparatus 100, an ROM (Read Only Memory) 132 for storing programs and the like, an RAM (Random Access Memory) 134 as a volatile storage device, an HDD (Hard Disk Drive) 136 as a non-volatile storage device retaining data even when power is turned off, and a bus 142. ROM 132 stores programs and data necessary for controlling operations of image forming apparatus 100.

CPU 130, ROM 132, RAM 134 and HDD 136 are connected to bus 142. Data (including control information) are exchanged between each of these units through bus 142. CPU 130 reads a program from ROM 132 to RAM 134 through bus 142, and executes the program using part of RAM 134 as a work area. Specifically, CPU 130 controls various units forming image forming apparatus 100 in accordance with a program stored in ROM 132 and realizes various functions of image forming apparatus 100.

Image forming apparatus 100 includes, in addition to automatic document feeder 120, image reading unit 140, paper feed unit 156, operation unit 160, in-barrel type paper discharge tray 170, front side USB socket 184 and back side USB socket 186, an image forming unit 150, an image processing unit 152, an image memory 154, a USB host controller 180 and a USB hub 182. These components (except for USB hub 182) are also connected to bus 142. Though not shown, similar to a common image forming apparatus, image forming apparatus 100 has an NIC for connection to a network using a communication cable, a FAX communication modem or the like.

Operation unit 160 receives inputs such as an instruction to image forming apparatus 100 from a user. Operation unit 160 includes an operation panel 162 and an operation key portion (an area of operation unit 160 other than operation panel 162). Operation panel 162 includes a display panel implemented, for example, by a liquid crystal panel, and a touch-panel arranged on the display panel, for detecting a touched position. In order to operate image forming apparatus 100, soft keys are displayed on the display panel, and on the operation key portion, hard keys are arranged. CPU 130 monitors user's operation on these keys. The user can press or touch these keys to input an instruction of image formation, settings of image formation conditions or the like to image forming apparatus 100. Selection of a key displayed on the display panel can be done by touching the corresponding portion of the touch-panel superposed on the display panel.

When the user operates operation unit 160 and thereby instructs formation of an image, image reading unit 140 reads a document and generates image data, and the image data is temporarily stored in image memory 154. Image processing unit 152 executes various image processing operations on the image data stored in image memory 154. The image data is stored in HDD 136 as needed.

Paper feed unit 156 includes a paper feed cassette and holds sheets of recording paper for forming images. Image forming unit 150 includes a photoreceptor drum, a charger, an optical scanning device, a developer, a transfer roller, a fixing unit and the like, and forms image data read from image memory 154 or from HDD 136 on a sheet of recording paper fed from paper feed unit 156.

USB host controller 180, USB hub 182, front side USB socket 184 and back side USB socket 186 are connected in a known USB connection topology (multi-star topology). USB host controller 180 also serves as a root hub of the highest level. Front side USB socket 184 and back side USB socket 186 are both sockets to which a known series A plug is connected.

Figure 4:
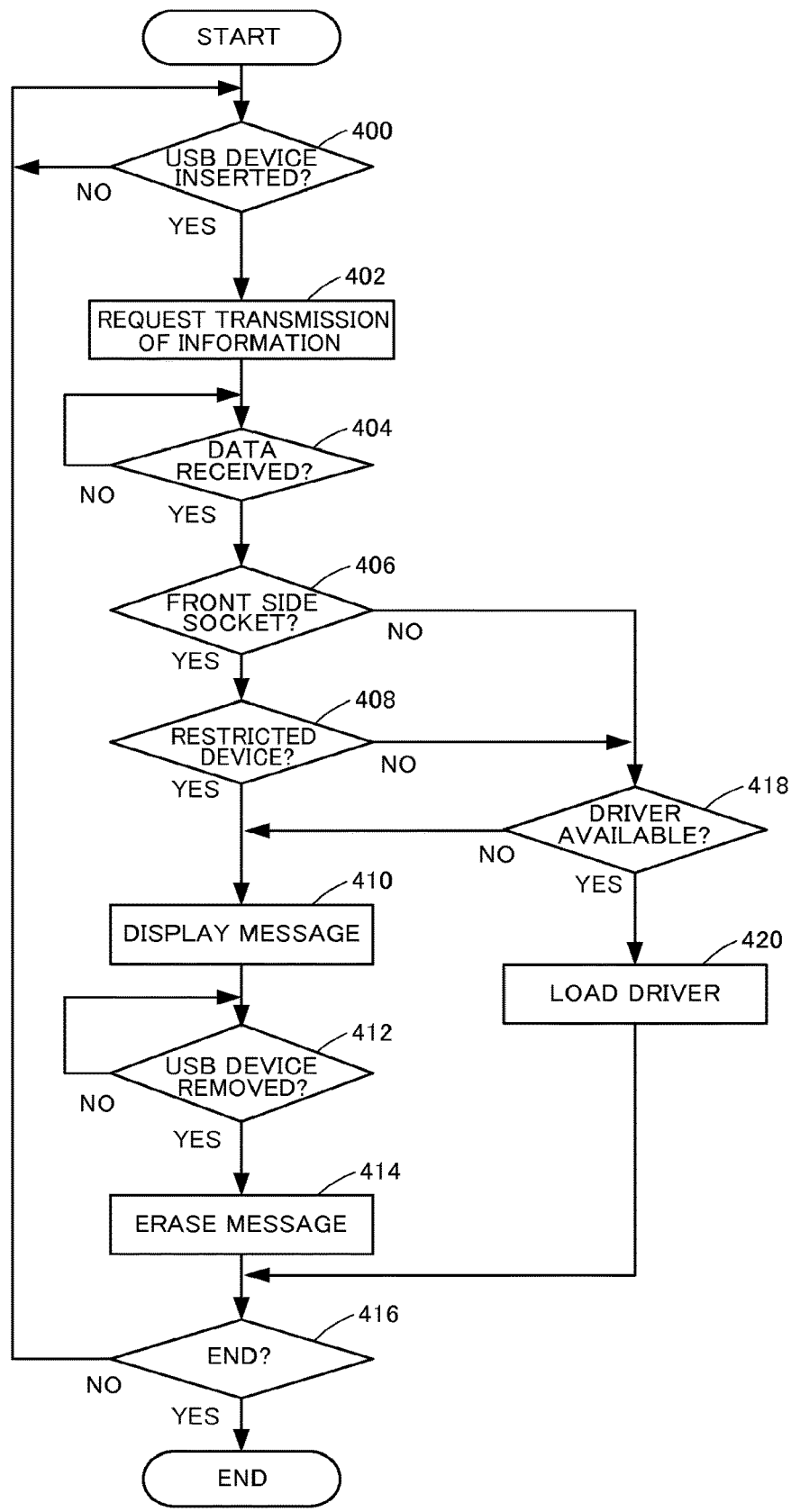
FIG. 4 is a flowchart representing a control structure of a program restricting use of a USB device connected to a USB socket, in the image forming apparatus in accordance with an embodiment of the present invention.

In the following, a program for restricting use of a USB device connected to the USB socket, executed in image forming apparatus 100 will be described with reference to FIG. 4. Information (port number) for specifying the USB socket, the use of USB device inserted to which is to be restricted, and information (information of USB descriptor, as will be described later) for specifying the USB device of which use is to be restricted, are stored in advance in HDD 136. Here, "use of USB device . . . restricted" and "USB device of which use is to be restricted" mean the possibility that image forming apparatus 100 does not load a device driver (software program of lower level, necessary for the OS (Operating System) to control hardware) corresponding to the USB device, so that the USB device is kept in a non-usable state.

In the following description, it is assumed that when a USB wireless LAN adapter is inserted to front side USB socket 184, the USB wireless LAN adapter is not set to a usable state, or it is kept unusable, while the use of any USB device is not restricted when it is inserted to back side USB socket 186. Further, it is assumed that when a USB device other than the USB wireless LAN adapter is inserted to front side USB socket 184, the USB device is made usable.

At step 400, CPU 130 determines whether or not a plug of a USB device is connected to front side USB socket 184 or to a back side USB socket 186. The USB device may be a USB memory, a USB wireless LAN adapter or the like. Whether a plug of USB device is inserted to front side USB socket 184 or not can be determined, for example, by monitoring electric potential of a specific terminal (for example, a "+ Data" terminal or "− Data" terminal for data transmission) of front side USB socket 184. The same applies to back side USB socket 186. The terminal of USB socket, which has been unconnected and open, has its electric potential changed when it is connected to a plug terminal of a USB device. If it is determined that a plug of USB device is inserted, the control proceeds to step 402. Otherwise, step 400 is repeated. CPU 130 may monitor the electric potential of USB socket terminal on a regular basis, or an interruption to CPU 130 may be caused when the electric potential changes.

Figure 5:
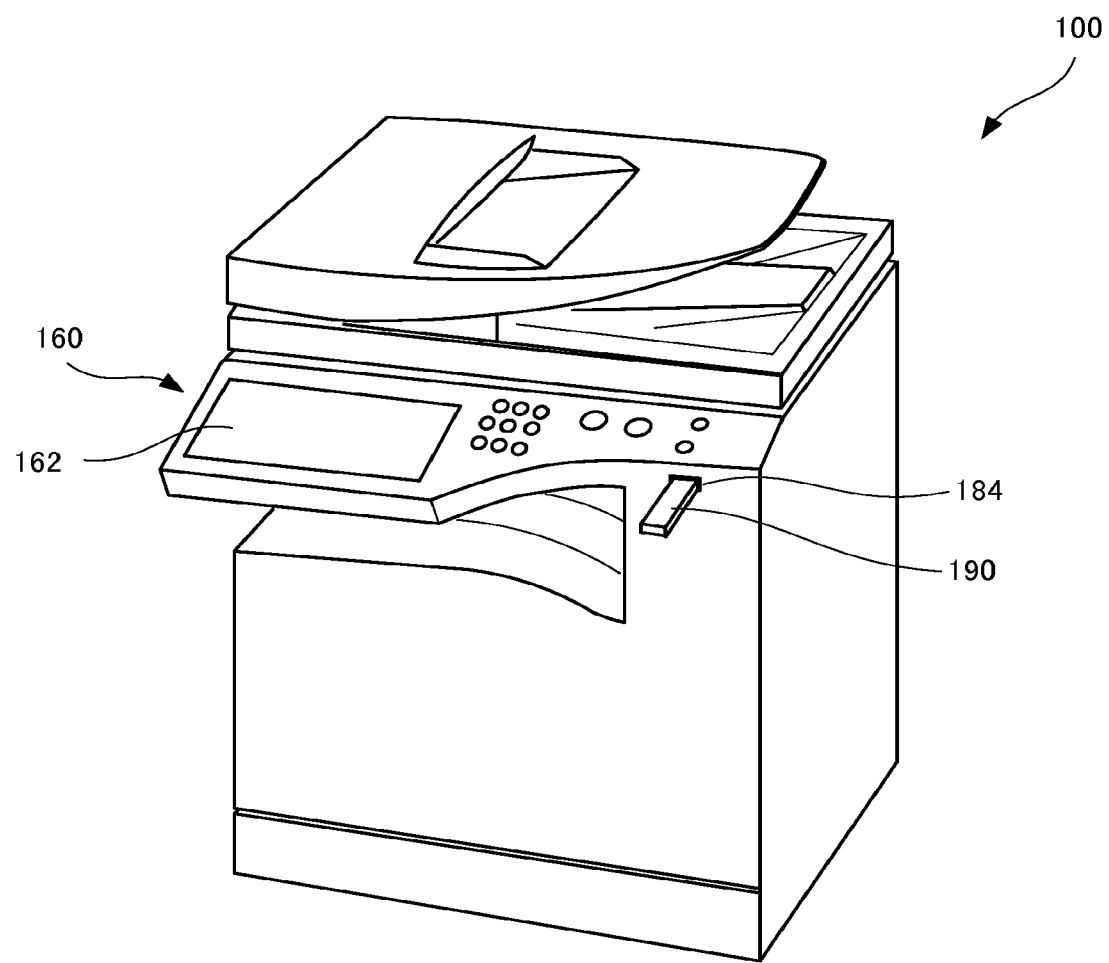
FIG. 5 is a perspective view showing a USB device inserted to a front side USB socket of the image forming apparatus in accordance with an embodiment of the present invention.

In the following, it is assumed that a USB wireless LAN adapter 190 is connected to front side USB socket 184 by an administrator or a service person, as shown in FIG. 5.

At step 402, CPU 130 controls USB host controller 180 and thereby requests the USB device (USB wireless LAN adapter 190) connected to front side USB socket 184 for information for specifying the USB device, through USB hub 182. Communication between USB host controller 180 and the USB device is realized in accordance with known USB standard. Specifically, USB host controller 180 transmits a reset instruction for resetting the inserted USB wireless LAN adapter 190, and thereafter transmits an instruction (GET_DESCRIPTOR) to get descriptor information of USB wireless LAN adapter 190. Receiving the instruction, USB wireless LAN adapter 190 must return the descriptor stored therein, in a prescribed data format without fail.

At step 404, CPU 130 determines whether or not USB host controller 180 has received the requested information (descriptor) from the USB device. If it is determined that the information has been received, the control proceeds to step 406. Otherwise, step 404 is repeated. Before proceeding to step 406, CPU 130 stores the received information in RAM 134.

At step 406, CPU 130 determines whether or not the USB socket to which the USB device is inserted is the front side USB socket 184. Specifically, CPU 130 reads a port number at which the use of USB device is restricted from HDD 136, and determines whether the port number matches that of the USB socket to which insertion of a USB device has been detected at step 400. If the port number of the USB socket to which insertion has been detected matches the port number read from HDD 136, it is determined that the device is inserted to front side USB socket 184, and the control proceeds to step 408. Otherwise, the control proceeds to step 418.

At step 408, CPU 130 determines whether the inserted USB device is the device of which use is restricted. This can be determined using the class information (class ID) of USB descriptor.

A USB device has its class ID determined by "USB Implementers Forum, Inc." in accordance with its function or the like. By way of example, class ID "E0h" ("h" represents that the number is in hexadecimal notation; same in the following) is allocated to wireless LAN adapter 190. Here, the use of USB wireless LAN adapter 190 is restricted. Therefore, as the information for specifying the USB device of which use is restricted, "E0h" is stored beforehand in HDD 136. CPU 130 determines whether the class ID of descriptor received from the USB device and stored in RAM 134 at step 404 matches "E0h" read from HDD 136. If it is determined to be the USB device of which use is restricted (class ID is "E0h"), the control proceeds to step 410. Otherwise (class ID is not "E0h"), the control proceeds to step 418.

At step 418, CPU 130 determines, in order to make the inserted USB usable, whether or not corresponding device driver is stored in HDD 136. If it is determined that the corresponding device driver is stored in HDD 136, the control proceeds to step 420, at which CPU 130 loads the corresponding device driver, that is, reads the corresponding device driver from HDD 136 to RAM 134, and sets the device driver to an executable state. Thereafter, the control proceeds to step 416. Thus, the inserted USB device becomes usable in image forming apparatus 100. On the other hand, if it is determined that the corresponding device driver is not stored in HDD 136, the control proceeds to step 410. Here, it is assumed that USB wireless LAN adapter 190 is inserted and, therefore, steps 418 and 420 are not executed.

Figure 6:
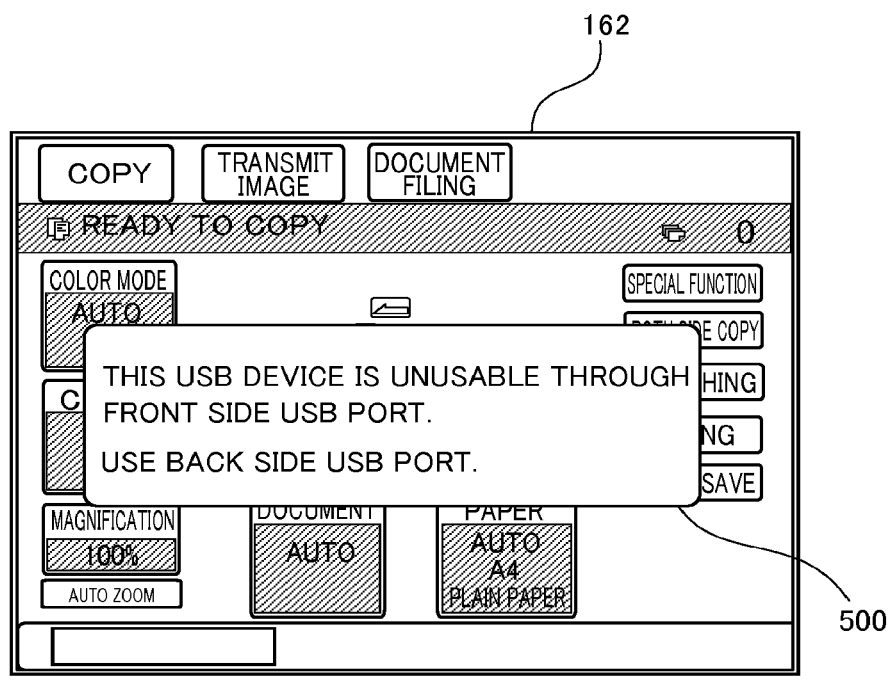
FIG. 6 is a screen image showing an example of a message displayed on the image forming apparatus.

At step 410, CPU 130 displays a prescribed message on operation panel 162. When the flow proceeds from step 408 to 410, CPU 130 displays, for example, a message 500 shown in FIG. 6. FIG. 6 shows message 500, displayed superposed on the operation screen image of image forming apparatus 100 displayed on operation panel 162, indicating that the inserted USB device (USB wireless LAN adapter 190) is not usable through front side USB socket 184 but usable through back side USB socket 186. Thus, it is possible for the administrator or service person to pull out the USB device, that is, USB wireless LAN adapter 190, inserted to front side USB socket 184 and insert the same to back side USB socket 186.

Figure 7:
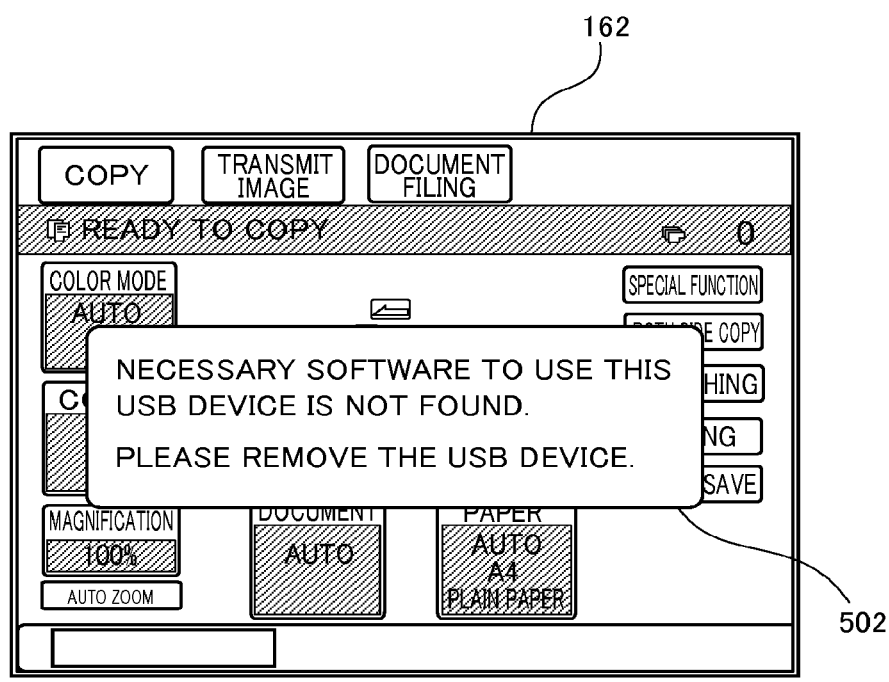
FIG. 7 is a screen image showing an example of a message displayed on the image forming apparatus.
Figure 9:
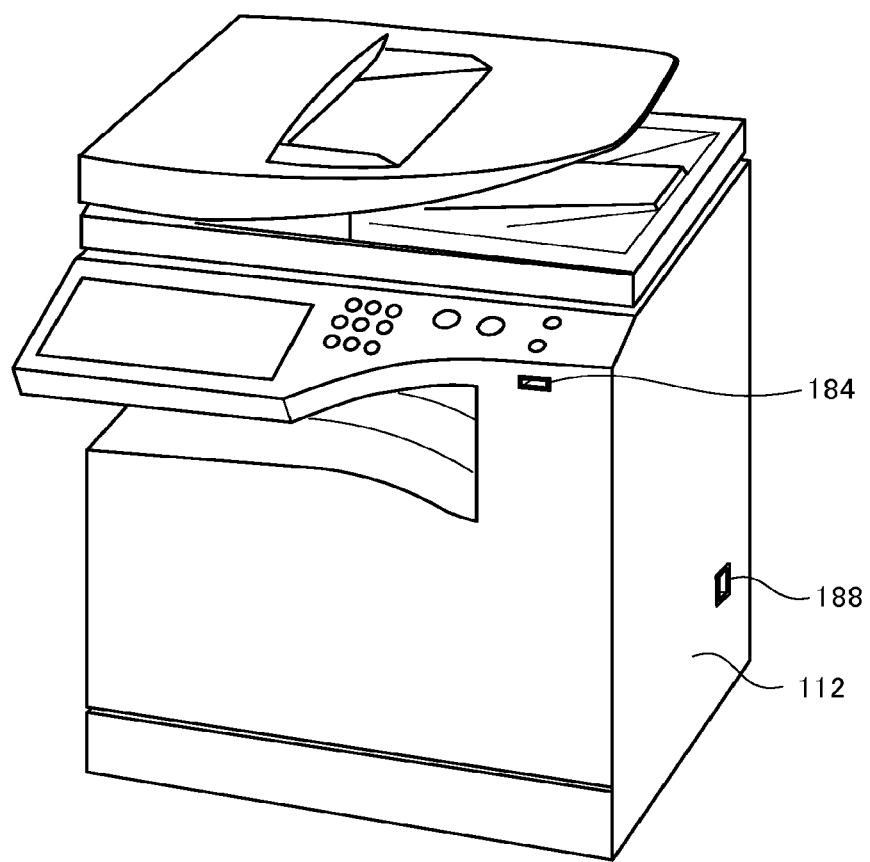
FIG. 9 is a perspective view showing an image forming apparatus having a USB socket on a side surface.

On the other hand, if the flow proceeds from step 418 to step 410, CPU 130 displays, for example, a message 502 shown in FIG. 7. FIG. 7 shows message 502, displayed superposed on the operation screen image of image forming apparatus 100 displayed on operation panel 162, indicating that the inserted USB device is unusable, since the device driver of the inserted USB device is not found. Accordingly, it is possible for a general user to pull out the USB device inserted to front side USB socket 184 and, if necessary, to ask the administrator or service person to install the corresponding device driver to image forming apparatus 100.

Whether step 410 is executed after step 408 or 418 can be determined by a flag. By way of example, assume that the initial value of the flag is "0". If it is determined at step 408 that the device is the USB device of which use is restricted, CPU 130 sets the flag to "1". At step 410, CPU 130 displays message 500 such as shown in FIG. 6 if the flag is "1", and displays message 502 such as shown in FIG. 7 if the flag is "0". After displaying the message, CPU 130 resets the flag to "0".

At step 412, CPU 130 determines whether or not the inserted USB device has been removed. Whether the USB device is removed or not can be determined by detecting the change in electric potential of a prescribed terminal of USB socket. If it is determined that the USB device has been removed, the control proceeds to step 414. Otherwise, step 412 is repeated.

At step 414, CPU 130 erases the message displayed on operation panel 162, and displays the original operation screen image.

At step 416, CPU 130 determines whether or not an instruction to end has been received. If it is determined that the end instruction is received, the program ends. Otherwise, the control returns to step 400. The end instruction is given, for example, when the power of image forming apparatus 100 is turned off.

In the above-described manner, if USB wireless LAN adapter 190 is inserted to front side USB socket 184 and the corresponding device driver is stored in HDD 136, USB wireless LAN adapter 190 is not set to a usable state since steps 400 to 410 are executed, and a message to that effect is displayed on operation panel 162. Viewing the message, the administrator or service person removes USB wireless LAN adapter 190 from front side USB socket 184 and inserts it to back side USB socket 186. Thereafter, steps 400 to 406 and steps 418 to 420 are executed, so that USB wireless LAN adapter 190 becomes usable. Since USB wireless LAN adapter 190 is used inserted to back side USB socket 186 that is not easily accessible, even though it is used in the constantly connected state, possibility of any damage or erroneous removal is low.

When a general user inserts a USB device (for example, a USB memory) other than USB wireless LAN adapter 190 to front side USB socket 184, at step 408, it is determined to be a USB device of which use is not restricted and, therefore, the device is made usable.

Though an example in which class information is used for specifying the USB device of which use is restricted has been described above, it is not limiting. By way of example, vender ID and product ID in the descriptor may be used. In that case, at step 408, CPU 130 may determine whether or not the vender ID and the product ID (which are stored in RAM 134 at step 404) of the descriptor received from the USB device match the vendor ID and the product ID (information for specifying the USB device of which use is restricted) stored beforehand in HDD 136.

Vender ID represents information for specifying the manufacturer of the USB device, and product ID represents information for specifying the product of the manufacturer. The product ID is designated by the manufacturer of the USB device, while the vendor ID is determined upon application by the manufacturer to "USB Implementers Forum, Inc." The vendor IDs are publicly known and data corresponding to the manufacturers are available at the web page of "USB Implementers Forum, Inc." (http://www.usb.org).

Though an example in which the USB device of which use is restricted is a USB wireless LAN adapter has been described above, it is not limiting. It may be any USB-connectable device that expands the function of image forming apparatus, and it may be an external storage device (HDD or the like) or a user authentication apparatus (IC card reader, magnetic card reader, or fingerprint authentication device) or the like. If such a device is used constantly connected to the front side USB socket, possibility of damage or erroneous removal is high. Therefore, it is desirable to make the device unusable when it is connected to the front side USB socket.

FIG. 8 shows examples of class ID. For instance, the class ID of an IC card reader is "0Bh". Therefore, when an IC card reader is connected to an image forming apparatus to be used for user authentication using an IC card, "0Bh" should be stored beforehand in HDD 136 as the information for specifying the USB device of which use is restricted, so that the IC card reader is not connected to the front side USB socket. If a fingerprint reader is connected for user authentication, "0Dh" should be stored beforehand in HDD 136 as the information for specifying the USB device of which use is restricted. If use of two or more USB devices is to be restricted, class IDs of these devices may be stored in advance in HDD 136.

It is noted that the class ID of an external storage device such as an external HDD is "08h", which is the same as that of a USB memory. Therefore, it is impossible to distinguish them only by the class ID. It is possible, however, to restrict use of an external storage device by using vendor ID and product ID.

Though an image forming apparatus having USB sockets on the front and back sides has been describe above, it is not limiting. The present invention is applicable to any image forming apparatus that has a USB socket at a position where the user can manually insert and remove the USB device (for example, front side) and a USB socket at a position where the user cannot manually insert and remove the USB device (for example, on a side other than the front side), when the user stands near the operation unit for operating the image forming apparatus. By way of example, if the image forming apparatus has USB sockets on the front side and on the deep position on the right side, the USB socket 188 on the side surface may be handled in the same manner as back side USB socket 186 described above.

Though an example in which the device driver is automatically loaded and the USB device is made usable at step 420 has been described above, a screen image allowing input of necessary settings may be displayed on operation panel 162. By way of example, if it is a USB wireless LAN adapter, it is possible to have the device driver loaded and to automatically detect and connect to a wireless router or an access point nearby. If a plurality of connectable wireless routers or access points are detected at that time, the detected plurality of connection destinations may be displayed on operation panel 162, allowing selection by the user. Alternatively, after the device driver is loaded, a screen image allowing input of an IP address of the connection destination may be displayed. Further, known security of wireless communication such as WEP (Wired Equivalent Privacy), WPA (Wi-Fi Protected Access) or the like may be set.

The embodiments as have been described here are mere examples and should not be interpreted as restrictive. The scope of the present invention is determined by each of the claims with appropriate consideration of the written description of the embodiments and embraces modifications within the meaning of, and equivalent to, the languages in the claims.

INDUSTRIAL APPLICABILITY

By the present invention, an image forming apparatus capable of reducing the possibility of a USB-connected function enhancement device such as a USB wireless LAN adapter being damaged by an external force and the possibility of such a device being erroneously removed can be provided.

DESCRIPTION OF THE REFERENCE SIGNS

100 image forming apparatus
110 body
120 automatic document feeder
130 control unit (CPU)
132 ROM
134 RAM
136 HDD
140 image reading unit (scanner unit)
142 bus
150 image forming unit
152 image processing unit
154 image memory
156 paper feed unit
160 operating unit
162 operation panel
170 in-barrel type paper discharge tray
180 USB host controller
182 USB hub
184 front side USB socket
186 back side USB socket
190 USB wireless LAN adapter

The invention claimed is:

1. An image forming apparatus comprising:
a plurality of USB sockets; and
a controller that selectively executes a process of making, in mutually different manners, usable or unusable a device connected to a first USB socket of the plurality of USB sockets and a device connected to a second USB socket of the plurality of USB sockets different from the first USB socket; wherein
a plurality of different types of devices usable with the first USB socket are set;
one or a plurality of different types of devices usable with the second USB socket are set;
at least one of the plurality of different types of devices set for the first USB socket is a USB memory device; and
at least one of the plurality of different types of devices set for the second USB socket is a user authentication device or a human interface device.

2. The image forming apparatus according to claim 1, further comprising:
an operation input interface to receive an instruction from a user; wherein
the first USB socket is located on a front side of the image forming apparatus where the operation input interface is located; and
the second USB socket is located on a side other than the front side of the image forming apparatus.

3. The image forming apparatus according to claim 2, wherein the second USB socket is located on a back side opposite to the front side of the image forming apparatus.

4. The image forming apparatus according to claim 1, wherein the controller determines whether or not a USB device connected to the first USB socket is to be made usable, by obtaining class information from the USB device connected to the first USB socket and determining whether or not the class information is prescribed class information.

5. The image forming apparatus according to claim 1, wherein the controller determines whether or not a USB device connected to the first USB socket is to be made usable, by obtaining a vendor ID and a product ID from the USB device connected to the first USB socket and determining whether the vendor ID and the product ID are a prescribed vendor ID and a prescribed product ID.

6. The image forming apparatus according to claim 1, further comprising a display that displays information; wherein
the process of the controller making unusable the device connected to the first USB socket includes displaying information on the display indicating that the device connected to the first USB socket is unusable.

7. An image forming apparatus comprising:
a plurality of USB sockets; and
a controller that selectively executes a process of making, in mutually different manners, usable or unusable a device connected to a first USB socket of the plurality of USB sockets and a device connected to a second USB socket of the plurality of USB sockets that is different from the first USB socket; wherein
only one type of device usable with the first USB socket is set;
a plurality of different types of devices usable with the second USB socket are set;
the only one type of device set for the first USB socket is a USB memory device; and
at least one of the plurality of different types of devices set for the second USB socket is a user authentication device or a human interface device.

8. The image forming apparatus according to claim 7, further comprising:
an operation input interface to receive an instruction from a user; wherein
the first USB socket is located on a front side of the image forming apparatus where the operation input interface is located; and
the second USB socket is located on a side other than the front side of the image forming apparatus.

9. The image forming apparatus according to claim 8, wherein the second USB socket is located on a back side opposite to the front side of the image forming apparatus.

10. The image forming apparatus according to claim 7, wherein the controller determines whether or not a USB device connected to the first USB socket is to be made usable, by obtaining class information from the USB device connected to the first USB socket and determining whether or not the class information is prescribed class information.

11. The image forming apparatus according to claim 7, wherein the controller determines whether or not a USB device connected to the first USB socket is to be made usable, by obtaining a vendor ID and a product ID from the USB device connected to the first USB socket and determining whether the vendor ID and the product ID are a prescribed vendor ID and a prescribed product ID.

12. An image forming apparatus comprising:
a first USB socket at a first location on the image forming apparatus;
a second USB socket at a second location on the image forming apparatus different from the first location, the second USB socket being usable with at least one device that is different from a device or devices usable with the first USB socket; and
a controller that selectively executes a process of restricting use of one of the first USB socket and the second USB socket without affecting usability of the other one of the first USB socket and the second USB socket that is not restricted by the controller; wherein
the device or devices usable with the first USB socket includes a USB memory device; and
the at least one device usable with the second USB socket includes a user authentication device or a human interface device.

13. The image forming apparatus according to claim 12, wherein
the at least one device usable with the second USB socket includes a USB memory device; and
the controller performs the process of restricting use of the one of the first USB socket and the second USB socket such that the one of the first USB socket and the second USB socket restricted from use cannot read data from or store data to the USB memory device, and the other one of the first USB socket and the second USB socket not restricted from use can read data or store data to the USB memory device connected thereto.

14. The image forming apparatus according to claim 12, further comprising:
an operation input interface to receive an instruction from a user to input an instruction to the image forming apparatus to change a setting of the image forming apparatus; wherein
the operation input interface is located on a first side of the image forming apparatus;
the first USB socket is located on the first side of the image forming apparatus; and
the second USB socket is located on a second side of the image forming apparatus opposite to the first side.

15. The image forming apparatus according to claim 14, wherein the first side of the image forming apparatus is a front side and the second side of the image forming apparatus is a back side.

16. The image forming apparatus according to claim 12, wherein the controller determines whether or not a USB device connected to the one of the first USB socket and the second USB socket is to be made usable, by obtaining class information from the USB device connected to the one of the first USB socket and the second USB socket and determining whether or not the class information is prescribed class information.

17. The image forming apparatus according to claim 12, wherein the controller determines whether or not a USB device connected to the one of the first USB socket and the second USB socket is to be made usable, by obtaining a vendor ID and a product ID from the USB device connected to the one of the first USB socket and the second USB socket and determining whether the vendor ID and the product ID are a prescribed vendor ID and a prescribed product ID.

* * * * *